(12) United States Patent
Cui et al.

(10) Patent No.: US 11,469,918 B2
(45) Date of Patent: Oct. 11, 2022

(54) HIGH-SPEED REAL-TIME BUS SYSTEM AND DATA PROCESSING METHOD THEREOF

(71) Applicants: Zhili Cui, Beijing (CN); Qingliang Guo, Beijing (CN)

(72) Inventors: Zhili Cui, Beijing (CN); Qingliang Guo, Beijing (CN)

(73) Assignee: NANOVISION TECHNOLOGY (BEIJING) CO., LTD, Beijing (CN)

( * ) Notice: Subject to any disclaimer, the term of this patent is extended or adjusted under 35 U.S.C. 154(b) by 179 days.

(21) Appl. No.: 16/914,272

(22) Filed: Jun. 27, 2020

(65) Prior Publication Data

US 2020/0358633 A1  Nov. 12, 2020

Related U.S. Application Data

(63) Continuation of application No. PCT/CN2018/125758, filed on Dec. 29, 2018.

(30) Foreign Application Priority Data

Dec. 29, 2017 (CN) .......................... 201711474023.6

(51) Int. Cl.
*H04L 12/40* (2006.01)
*G06F 13/42* (2006.01)
*H04L 12/403* (2006.01)
*H04L 41/0806* (2022.01)
*H04L 67/50* (2022.01)

(52) U.S. Cl.
CPC .... *H04L 12/40006* (2013.01); *G06F 13/4291* (2013.01); *H04L 12/403* (2013.01); *H04L 41/0806* (2013.01); *H04L 67/535* (2022.05)

(58) Field of Classification Search
CPC ............. H04L 12/40006; H04L 12/403; H04L 41/0806; H04L 67/22; G06F 13/4291
USPC .......................................................... 710/110
See application file for complete search history.

(56) References Cited

U.S. PATENT DOCUMENTS

| | | | | |
|---|---|---|---|---|
| 3,810,100 A | * | 5/1974 | Hungerford | H04L 5/00 370/452 |
| 4,677,614 A | * | 6/1987 | Circo | H04L 12/433 370/518 |
| 4,807,223 A | * | 2/1989 | Wells | H04L 12/413 370/461 |
| 5,206,857 A | * | 4/1993 | Farleigh | H04J 3/0682 370/452 |

(Continued)

*Primary Examiner* — Paul R. Myers
(74) *Attorney, Agent, or Firm* — George Guosheng Wang; Upstream Research and Patent LLC

(57) ABSTRACT

Disclosed are a high-speed real-time bus system and a data processing method thereof. Each node device forms an annularly connected topological structure by means of a high-speed real-time bus; a master node device respectively sends a bus clock signal and a data signal to a slave node device of the next grade of the master node device in the topological structure by means of a clock channel and a data channel; each slave node device receives the bus clock signal and the data signal sent from the respective node device of the previous grade, performs data processing according to the bus clock signal and the data signal so as to update the data signal and sends the bus clock signal and the updated data signal to the respective node device of the next grade.

19 Claims, 8 Drawing Sheets

(56) References Cited

U.S. PATENT DOCUMENTS

| | | | | |
|---|---|---|---|---|
| 5,461,608 | A * | 10/1995 | Yoshiyama | H04J 3/085 |
| | | | | 709/251 |
| 5,936,969 | A * | 8/1999 | Stiegler | H04L 12/43 |
| | | | | 370/503 |
| 6,625,163 | B1 * | 9/2003 | Shideler | H04L 12/40013 |
| | | | | 370/445 |
| 6,658,016 | B1 * | 12/2003 | Dai | H04L 49/102 |
| | | | | 370/438 |
| 7,133,936 | B2 * | 11/2006 | Katta | H04L 25/066 |
| | | | | 709/251 |
| 7,280,550 | B1 * | 10/2007 | Rosenboom | H04L 7/0008 |
| | | | | 370/452 |
| 7,406,354 | B2 * | 7/2008 | Pearce | H04L 12/423 |
| | | | | 370/452 |
| 11,251,991 | B2 * | 2/2022 | Kajino | H04L 43/065 |
| 2006/0155816 | A1 * | 7/2006 | Umei | H04N 21/43615 |
| | | | | 375/E7.278 |
| 2006/0171352 | A1 * | 8/2006 | Seo | H04L 29/12311 |
| | | | | 370/328 |

* cited by examiner

HIGH-SPEED REAL-TIME BUS SYSTEM AND DATA PROCESSING METHOD THEREOF

BACKGROUND

Technical Field

The invention relates to a high-speed real-time bus system, further relates to a data processing method for the high-speed real-time bus system, and belongs to the technical field of data processing.

Related Art

Static CT is a novel CT (Computed Tomography) technical solution. In the case of its overall structure, a full circle of detectors and a full circle of radiation sources are adopted, and through timing ray-emitting of all radiation source focuses on the circumference, the purpose of circular scanning the same as spiral CT is achieved. The static CT does not need rotating parts in theory, so it does not need bearings and slip rings, the structure is simple, the theoretical circumferential scanning speed is high, and the data transmission speed is high.

Currently, an image chain of the static CT is composed of a number of electrical subsystems (or electrical nodes), and these electrical nodes may include synchronous high-voltage radiation sources, image detectors, scanning frames and patient beds. Timing control and information interaction are required between the electrical nodes. How to provide a high-speed real-time bus with a simple structure, high real-time performance, relatively low cost and easy expansion to meet data communication in the static CT has become an urgent problem to be solved.

SUMMARY

The primary technical problem to be solved by the invention is to provide a high-speed real-time bus system.

Another technical problem to be solved by the invention is to provide a data processing method for the above high-speed real-time bus system.

In order to achieve the above objects of the invention, the invention adopts the following technical solution:

according to a first aspect of an embodiment of the invention, a high-speed real-time bus system is provided and includes a plurality of node devices; the plurality of node devices include a master node device and a plurality of slave node devices; each node device includes an input port and an output port; the output port of each node device is connected to the input port of another node device through a high-speed real-time bus, so that all the node devices form an annularly connected topological structure through the high-speed real-time bus; the high-speed real-time bus includes one clock channel and at least one data channel;

the master node device is configured to respectively send a bus clock signal and a data signal to the slave node device of the next grade of the master node device in the topological structure through the clock channel and the data channel; and each slave node device is configured to receive the bus clock signal and the data signal sent by the respective node device of the previous grade, perform data processing according to the bus clock signal and the data signal to update the data signal and send the bus clock signal and an updated data signal to the respective node device of the next grade, or enable the bus clock signal and the data signal to directly arrive at the respective node device of the next grade; and the master node device is enabled to obtain feedback information of each slave node device in the topological structure.

Preferably, the node device further includes a signal preprocessing module, a signal processing module and a signal postprocessing module; the signal processing module is respectively connected to the signal preprocessing module and the signal postprocessing module; the signal preprocessing module is connected to the high-speed real-time bus between the node device and its node device of the previous grade through the input port; and the signal postprocessing module is connected to the high-speed real-time bus between the node device and its node device of the next grade through the output port.

Preferably, when the node device is configured to send the bus clock signal and the data signal, the node device is specifically configured to:

convert parallel data into serial data through the signal processing module by adopting a working clock of the node device itself according to a preset protocol strategy;

down-convert the working clock of the node device itself to a bus clock through the signal postprocessing module according to electrical level modes of the high-speed real-time bus to form the bus clock signal, wherein a phase relationship between the bus clock and the working clock remains in-phase; and respectively and synchronously send the bus clock signal and the serial data to the clock channel and the data channel through the output port.

Preferably, when the node device is configured to receive the bus clock signal and the data signal, the node device is specifically configured to:

respectively receive the bus clock signal of the clock channel and serial data of the data channel through the input port;

multiply a bus clock represented by the bus clock signal to a working clock of the node device itself according to electrical level modes of the high-speed real-time bus through the signal preprocessing module, wherein a phase relationship between the working clock and the bus clock remains in-phase; and convert the serial data into parallel data through the signal processing module by adopting the working clock of the node device itself according to a preset protocol strategy.

Preferably, the master node device is further configured to generate the bus clock, and send the bus clock to the clock channel of the high-speed real-time bus; and generate a data frame entering a bus initialization mode, and continuously send the data frame entering the bus initialization mode to the data channel of the high-speed real-time bus, wherein the number of times of continuously sending the data frame entering the bus initialization mode is greater than or equal to the number of the slave node devices;

the slave node device is further configured to obtain the data frame entering the bus initialization mode from the data channel of the high-speed real-time bus, and enter a bus initialization mode;

the master node device is further configured to generate a feature code data frame and continuously send the feature code data frame to the data channel of the high-speed real-time bus, wherein the number of times of continuously sending the feature code data frame is greater than or equal to the number of the slave node devices;

the slave node device is further configured to obtain the feature code data frame from the data channel of the high-speed real-time bus; a phase of a working clock of the slave node device itself is adjusted, so that content of the data frame received by the slave node device and feature codes in the feature code data frame are consistent;

the master node device is further configured to generate a data frame exiting from the bus initialization mode and continuously send the data frame exiting from the bus initialization mode to the data channel of the high-speed real-time bus, wherein the number of times of continuously sending the data frame exiting from the bus initialization mode is greater than or equal to the number of the slave node devices;

the slave node device is further configured to obtain the data frame exiting from the bus initialization mode from the data channel of the high-speed real-time bus, and exit from the bus initialization mode to enter a normal working mode; and the master node device is further configured to determine whether each slave node device enters the normal working mode according to the feedback information of each slave node device in the topological structure; if each slave node device enters the normal working mode, the high-speed real-time bus system is controlled to enter the normal working mode; and if any of the slave node devices does not enter the normal working mode, the high-speed real-time bus is controlled to enter the bus initialization mode again.

Preferably, the master node device is further configured to send the data signal to the data channel of the high-speed real-time bus when the high-speed real-time bus system is in the normal working mode;

the slave node device is further configured to obtain the data signal from the data channel of the high-speed real-time bus, and parse a frame ID of the data signal to determine whether the frame ID of the data signal corresponds to preset address number of the slave node device itself, when the frame ID of the data signal corresponds to the preset address number of the slave node device itself, data processing is carried out according to actual data content in a data area of the data signal to form a data processing result;

the master node device is further configured to send another data signal with the same frame ID as the data signal to the data channel of the high-speed real-time bus; and the slave node device is further configured to obtain the another data signal from the data channel of the high-speed real-time bus, superpose the data processing result on a data frame of the another data signal, and transmit the data processing result to the data channel of the high-speed real-time bus, so that the master node device obtains the data processing result from the data channel of the high-speed real-time bus.

Preferably, the master node device is further configured to send a control data signal to the data channel of the high-speed real-time bus when the high-speed real-time bus system is in the normal working mode; the control data signal includes a control frame ID;

the slave node device is further configured to obtain the control data signal from the data channel of the high-speed real-time bus, superpose data to be transmitted into the control data signal corresponding to the control frame ID to form data signals to be transmitted, and allocate and transmit the data signals to be transmitted to the plurality of data channels of the high-speed real-time bus; the data signals to be transmitted include the control frame ID; and one or more slave node devices except the slave node device are configured to obtain the data signals to be transmitted corresponding to the control frame ID from the plurality of data channels of the high-speed real-time bus to obtain the data to be transmitted.

Preferably, the master node device determines a state of each slave node device according to the feedback information.

According to a second aspect of the embodiment of the invention, a data processing method for a high-speed real-time bus system is provided, and a plurality of node devices are included; the plurality of node devices include a master node device and a plurality of slave node devices; each node device includes an input port and an output port; the output port of each node device is connected to the input port of another node device through a high-speed real-time bus, so that all the node devices form an annularly connected topological structure through the high-speed real-time bus; and the high-speed real-time bus includes one clock channel and at least one data channel; and the data processing method includes the following steps:

respectively sending, by the master node device, a bus clock signal and a data signal to the slave node device of the next grade of the master node device in the topological structure through the clock channel and the data channel;

receiving, by each slave node device, the bus clock signal and the data signal sent by the respective node device of the previous grade, performing data processing according to the bus clock signal and the data signal to update the data signal and send the bus clock signal and an updated data signal to the respective node device of the next grade, or enabling the bus clock signal and the data signal to directly arrive at the respective node device of the next grade; enabling the master node device to obtain feedback information of each slave node device in the topological structure; and determining, by the master node device, a state of each slave node device according to the feedback information.

Preferably, the node device further includes a signal preprocessing module, a signal processing module and a signal postprocessing module; the signal processing module is respectively connected to the signal preprocessing module and the signal postprocessing module; the signal preprocessing module is connected to the high-speed real-time bus between the node device and its node device of the previous grade through the input port; and the signal postprocessing module is connected to the high-speed real-time bus between the node device and its node device of the next grade through the output port.

Preferably, the data processing method further includes:

converting, by the node device, parallel data into serial data through the signal processing module by adopting a working clock of the node device itself according to a preset protocol strategy when the node device is configured to send the bus clock signal and the data signal;

down-converting the working clock of the node device itself to a bus clock according to electrical level modes of the high-speed real-time bus to form the bus clock signal through the signal postprocessing module, wherein a phase relationship between the bus clock and the working clock remains in-phase; and respectively and synchronously sending the bus clock signal and the serial data to the clock channel and the data channel through the output port.

Preferably, the data processing method further includes:

respectively receiving, by the node device, the bus clock signal of the clock channel and the serial data of the data channel through the input port when the node device is configured to receive the bus clock signal and the data signal;

multiplying a bus clock represented by the bus clock signal to a working clock of the node device itself according to electrical level modes of the high-speed real-time bus through the signal preprocessing module, wherein a phase relationship between the working clock and the bus clock remains in-phase; and converting the serial data into the parallel data through the signal processing module by adopting the working clock of the node device itself according to a preset protocol strategy.

Preferably, the data processing method further includes:

generating, by the master node device, a bus clock, and sending the bus clock to the clock channel of the high-speed real-time bus; generating a data frame entering a bus initialization mode, and continuously sending the data frame entering the bus initialization mode to the data channel of the high-speed real-time bus, wherein the number of times of continuously sending the data frame entering the bus initialization mode is greater than or equal to the number of the slave node devices;

obtaining, by the slave node device, the data frame entering the bus initialization mode from the data channel of the high-speed real-time bus, and entering the bus initialization mode;

generating, by the master node device, a feature code data frame and continuously sending the feature code data frame to the data channel of the high-speed real-time bus, wherein the number of times of continuously sending the feature code data frame is greater than or equal to the number of the slave node devices;

obtaining, by the slave node device, the feature code data frame from the data channel of the high-speed real-time bus; adjusting a phase of a working clock of the slave node device itself to enable content of the data frame received by the slave node device and feature codes in the feature code data frame to be consistent;

generating, by the master node device, a data frame exiting from the bus initialization mode, and continuously sending the data frame exiting from the bus initialization mode to the data channel of the high-speed real-time bus, wherein the number of times of continuously sending the data frame exiting from the bus initialization mode is greater than or equal to the number of the slave node devices;

obtaining, by the slave node device, the data frame exiting from the bus initialization mode from the data channel of the high-speed real-time bus, and exiting from the bus initialization mode to enter a normal working mode; and determining, by the master node device, whether each slave node device enters the normal working mode according to the feedback information of each slave node device in the topological structure; if each slave node device enters the normal working mode, the high-speed real-time bus system is controlled to enter the normal working mode; and if any of the slave node devices does not enter the normal working mode, the high-speed real-time bus is controlled to enter the bus initialization mode again.

Preferably, the data processing method further includes:

sending, by the master node device, the data signal to the data channel of the high-speed real-time bus when the high-speed real-time bus system is in the normal working mode;

obtaining, by the slave node device, the data signal from the data channel of the high-speed real-time bus, and parsing a frame ID of the data signal to determine whether the frame ID of the data signal corresponds to a preset address number of the slave node device itself; performing data processing according to actual data content in a data area of the data signal to form a data processing result when the frame ID of the data signal corresponds to the preset address number of the slave node device itself;

sending, by the master node device, another data signal with the same frame ID as the data signal to the data channel of the high-speed real-time bus; and obtaining, by the slave node device, the another data signal from the data channel of the high-speed real-time bus, superposing the data processing result on a data frame of the another data signal, and transmitting the data processing result to the data channel of the high-speed real-time bus, and enabling the master node device to obtain the data processing result from the data channel of the high-speed real-time bus.

Preferably, the data processing method further includes:

sending, by the master node device, a control data signal to the data channel of the high-speed real-time bus when the high-speed real-time bus system is in the normal working mode, wherein the control data signal includes a control frame ID;

obtaining, by the slave node device, the control data signal from the data channel of the high-speed real-time bus, superposing data to be transmitted into the control data signal corresponding to the control frame ID to form data signals to be transmitted, and allocating and transmitting the data signals to be transmitted to the plurality of data channels of the high-speed real-time bus, wherein the data signals to be transmitted include the control frame ID; and obtaining, by one or more slave node devices except the slave node device, the data signals to be transmitted corresponding to the control frame ID from the plurality of data channels of the high-speed real-time bus to obtain the data to be transmitted.

Preferably, the electrical level modes of the high-speed real-time bus include a single-end mode, a low-voltage differential signaling mode, a single data rate mode and a double data rate mode;

when the single-end mode, the low-voltage differential signaling mode or the single data rate mode is adopted as the electrical level mode of the high-speed real-time bus, a frequency of a working clock is N times that of a bus clock; and when the double data rate mode is adopted as the electrical level mode of the high-speed real-time bus, the frequency of the working clock is 2N times that of the bus clock;

wherein N is the number of bits of the parallel data.

Preferably, a data frame format of the data signal includes the frame ID, the data area and a check bit; the frame ID is configured to represent the data frame ID of a preset mode and the slave node device address or the broadcast address corresponding to the data signal; the data area is configured to represent the actual data content of frame data in the data signal; and the check bit is a result of negation of the sum of the frame ID and each bit number of the data area.

According to the high-speed real-time bus system and the data processing method thereof provided by the invention, each node device is only provided with the one input port and the one output port, the whole topological structure is simple in structure, the transmission speed of the data signals in the topological structure is high, and the real-time performance is high; and in addition, other hardware devices do not need to be additionally arranged, the cost is relatively low, expansion can be carried out by increasing the number of the data channels, an expansion mode is simple, and high-speed data communication requirements in static CT can be met.

DETAILED DESCRIPTION

The following further describes the technical content of the invention with reference to the accompanying drawings and specific embodiments.

In an implementation process of the embodiments of the invention, an inventor finds that an existing industrial field bus has certain limitation on application requirements in a static CT system.

For example:

RS232 can only perform point-to-point communication, a multipoint networking is difficult to form, and a baud rate of the RS232 is low (a magnitude smaller than 100 Kbps), so that application of the static CT system cannot be met.

Bus networking may be carried out on RS485 and similar buses, all electrical nodes are hung on the buses, baud rates of the buses are not high (a magnitude smaller than 100 Kbps), a simplex mode is adopted, and efficiency is low, so that the application requirements of the static CT system cannot be met.

A CAN bus is a very effective field bus, is very wide in application and convenient to network, a baud rate of the CAN bus is 1 Mbps in theory, but for stability, a baud rate in practical application of the CAN bus is 700 Kbps or below, and the simplex mode is adopted, so that the application requirements of the static CT system cannot be met.

Networking based on network buses of gigabit and below is also convenient, but an additional switch is needed, and the hardware cost is increased; and besides, the theoretical maximum baud rate is 1000 Mbps, a head of a data packet occupies 46 bytes, assuming that information of a node is 2 bytes, the total length is 48 bytes, and an update rate of the node is 41 K. Therefore, the application requirements of the static CT system cannot be met as well.

Networking based on network buses of ten gigabits or above is also convenient, but a switch and an optical module need to be additionally arranged, so that the hardware cost is greatly increased; and besides, the theoretical minimum baud rate is 10000 Mbps, a head of a data packet occupies 46 bytes, assuming that information of a node is 2 bytes, the total length is 48 bytes, an update rate of the node is 410 K, the application of the static CT system can be met, but a technical threshold is high, and high-requirement hardware platform support is needed, so that the networking is not suitable for the application requirements of the static CT system.

Figure 1:
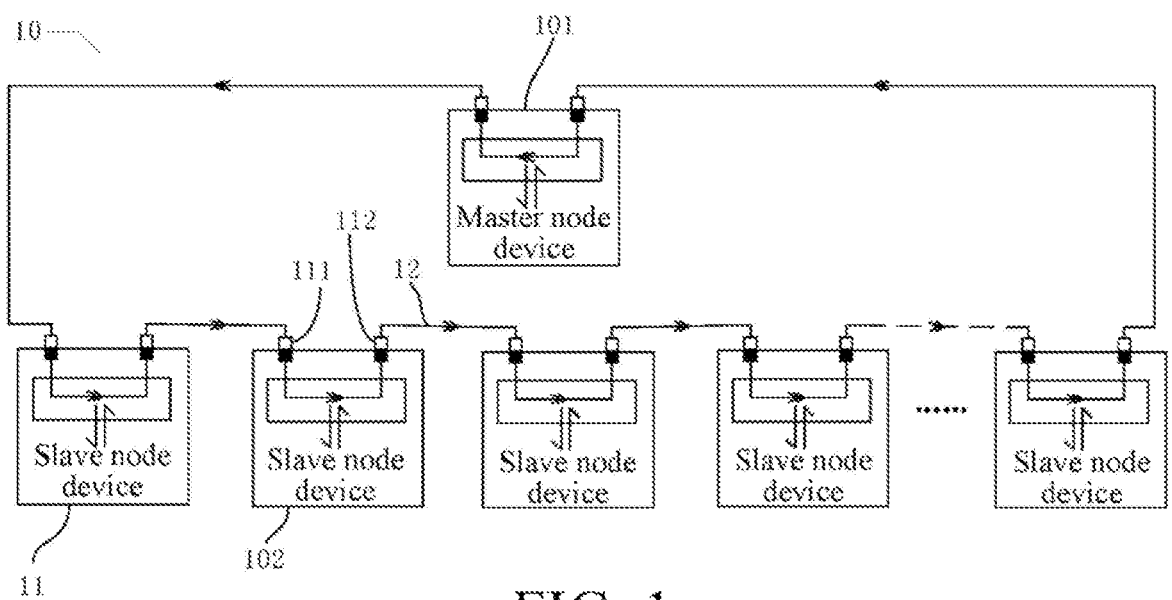
FIG. 1 is a schematic structural diagram of a high-speed real-time bus system provided by the invention.

In order to overcome the above defects that the existing industrial field bus cannot meet the application requirements in the static CT system, as shown in FIG. 1, a high-speed real-time bus system 10 provided by the embodiments of the invention includes a plurality of node devices 11; the plurality of node devices 11 include a master node device 101 and a plurality of slave node devices 102; and each node device 11 includes an input port 111 and an output port 112. The output port 112 of each node device 11 is connected to the input port 111 of another node device 11 through a high-speed real-time bus 12, all the node devices 11 are enabled to form an annularly connected topological structure through the high-speed real-time bus 12, and the whole topological structure constitutes the high-speed real-time bus system 10. The high-speed real-time bus 12 includes one clock channel and at least one data channel (not shown in FIG. 1, the clock channel and the data channel are described in detail in the subsequent embodiments). Through the input ports 111 and the output ports 112 of the above node devices 11, all the node devices 11 may be easily connected in series to form the above annularly connected topological structure, and the entire networking is very simple.

The master node device 101 is configured to send a bus clock signal and a data signal to the slave node device 102 of the next grade of the master node device 101 in the topological structure through the clock channel and the data channel.

Each slave node device 102 is configured to receive the bus clock signal and the data signal sent by the respective node device 11 (which may be the master node device 101 or the other slave node devices 102) of the previous grade, perform data processing according to the bus clock signal and the data signal to update the data signal and send the bus clock signal and an updated data signal to the respective node device 11 of the next grade, or enable the bus clock signal and the data signal to directly arrive at the respective node device 11 of the next grade; and the master node device 101 is enabled to obtain feedback information of each slave node device 102 in the topological structure.

The master node device 101 is further configured to determine a state of each slave node device 102 according to the feedback information. In this way, a pseudo "full-duplex" communication mode may be realized through the annually connected topological structure.

Figure 2:
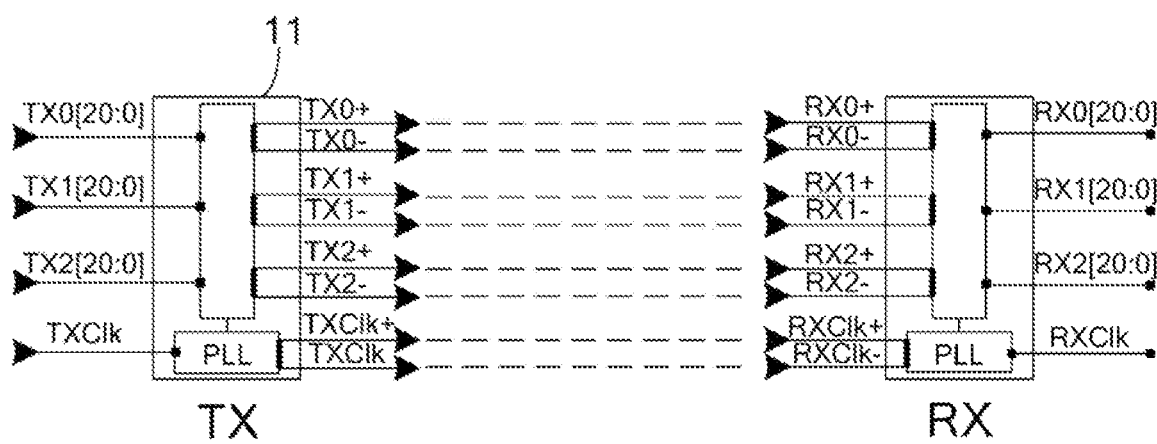
FIG. 2 is a schematic diagram of a basic electrical model of the high-speed real-time bus system provided by the invention.

Here, it is worth noting that the above high-speed real-time bus 12 includes one clock channel and at least one data channel. The clock channel is a carrier of the clock signal, the data channel is a carrier of the data signal, and a bus clock in the clock channel is synchronized with the data signal in the data channel to realize functions of transmission and phase lock. As shown in FIG. 2, a basic electrical model of the high-speed real-time bus system is illustrated, the two node devices 11 are taken as an example, and portions on the left and right sides respectively represent the two node devices 11 on the high-speed real-time bus system, wherein TX represents a sending node, and RX represents a receiving node.

In FIG. 2, there are 3 data channels (here, the 3 data channels are only taken as an example, but not a limitation to the number of the data channels), namely TX0+/− to RX0+/−, TX1+/− to RX1+/− and TX2+/− to RX2+/−. TX0 [20 . . . 0], TX1[20 . . . 0] and TX2[20 . . . 0], as well as RX0[20 . . . 0], RX1[20 . . . 0] and RX2[20 . . . 0] respectively represent parallel data on corresponding data channels, and a bit width of the parallel data in this example in FIG. 2 is 21 bits. In FIG. 2, TXClk+/− and RXClk+/− are bus clocks on the clock channel of the bus, and TXClk and RXClk are working clocks of the sending node and the receiving node respectively. Since the bit width of the parallel data is 21 bits, a frequency of the TXClk is 21 times that of the TXClk+/−. PLL is a frequency multiplier.

Figure 3:
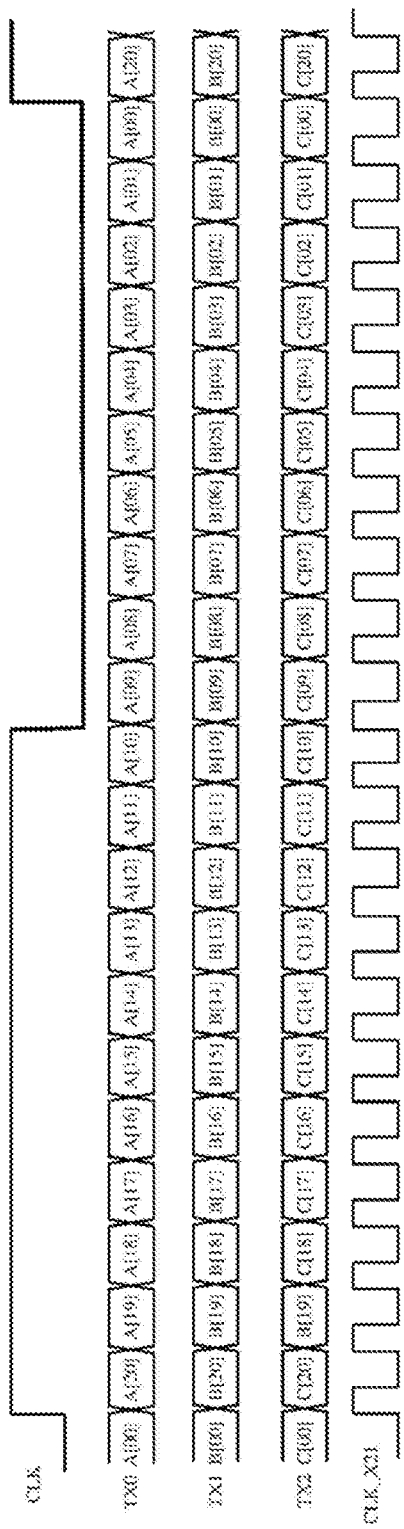
FIG. 3 is a schematic diagram of a timing relationship between a clock channel and a data channel in the invention.

As shown in FIG. 3, a timing relationship between the clock channel and the data channels is represented. In the figure, CLK is a bus clock, CLK_X21 is a working clock, and the CLK and the CLK_X21 have a 21-times relationship (a multiple relationship is consistent with the number of bits of the parallel data on the data channels) and are consistent in phase (in practical application, due to the influence of factors such as transmission delay, the phase (the receiving node) of the CLK_X21 needs to be adjusted to obtain a correct sampling position). TX0, TX1 and TX3 represent data on the three data channels respectively, 21 data bits are arranged in the whole period of the CLK, and the data bits are synchronous with the CLK_X21.

Figure 4:
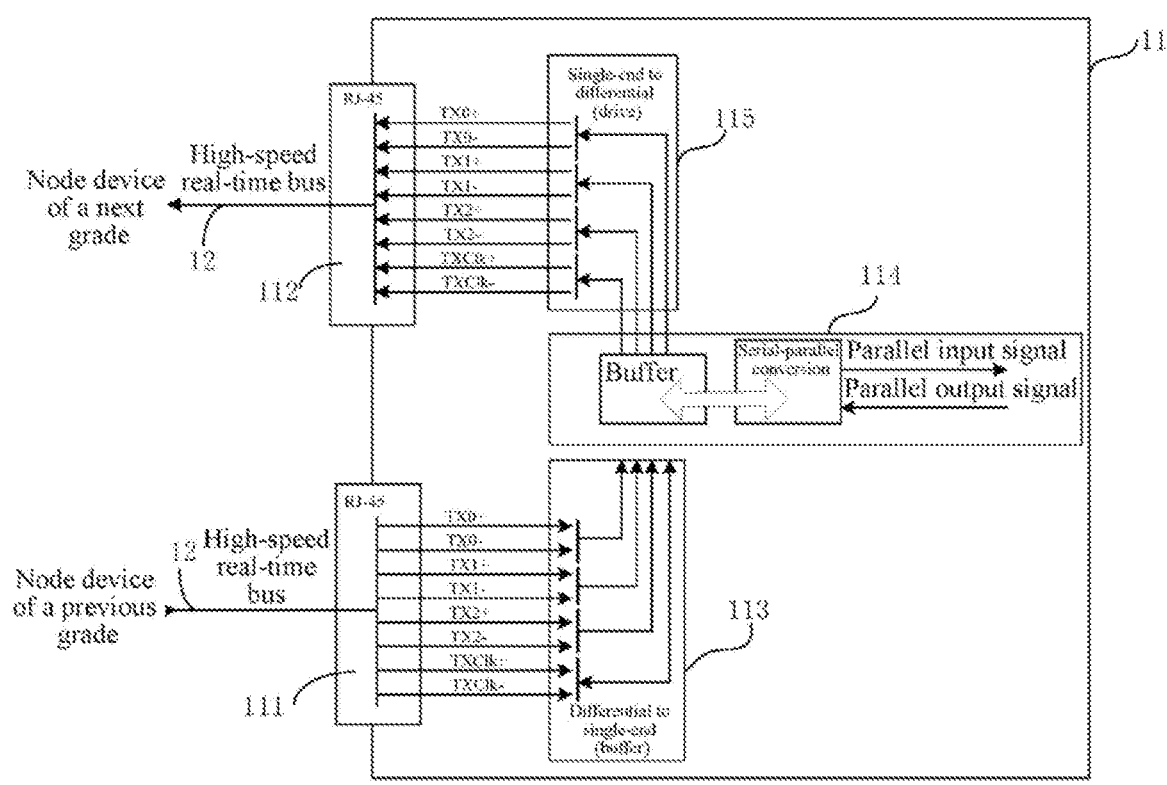
FIG. 4 is a schematic structural diagram of node devices in the invention.

Furthermore, as shown in FIG. 4, the node device 11 further includes a signal preprocessing module 113, a signal processing module 114 and a signal postprocessing module 115. The signal processing module 114 is respectively connected to the signal preprocessing module 113 and the signal postprocessing module 115. The signal preprocessing module 113 is connected to the high-speed real-time bus 12 between the node device 11 and its node device 11 of the previous grade through the input port 111; and the signal postprocessing module 115 is connected to the high-speed real-time bus 12 between the node device 11 and its node device 11 of the next grade through the output port 112. In FIG. 4, the input port 111 and the output port 112 may adopt RJ-45 ports. The signal processing module 114 may adopt a plurality of forms, wherein it is more flexible to implement in a field-programmable gate array (FPGA). In FIG. 4, the TX0+/−, the TX1+/−, the TX2+/− represent the data signals of the 3 data channels, and TXClk+/− represents the bus clock signal of the clock channel.

In addition, when the node device 11 is configured to send the bus clock signal and the data signal, the node device 11 is specifically configured to:

convert the parallel data into serial data through the signal processing module 114 by adopting a working clock of the node device itself according to a preset protocol strategy.

Through the signal postprocessing module 115, the working clock of the node device itself is down-converted to the bus clock according to electrical level modes of the high-speed real-time bus to form the bus clock signal. A phase relationship between the bus clock and the working clock remains in-phase. For example, a low-voltage differential signaling mode is adopted as the electrical level modes of the high-speed real-time bus, and then a single-end mode needs to be converted into the low-voltage differential signaling mode, so that a single-end signal is compatible with the electrical level modes of the high-speed real-time bus.

Through the output ports 112, the bus clock signal and the serial data are respectively and synchronously sent to the clock channel and the data channels.

In addition, when the node device 11 is configured to receive the bus clock signal and the data signal, the node device 11 is specifically configured to:

respectively receive the bus clock signal of the clock channel and the serial data of the data channels through the input ports 111.

Through the signal preprocessing module 113, the bus clock represented by the bus clock signal is multiplied to the working clock of the node device itself according to the electrical level modes of the high-speed real-time bus. The phase relationship between the working clock and the bus clock remains in-phase. For example, the low-voltage differential signaling mode is adopted as the electrical level mode of the high-speed real-time bus, and the low-voltage differential signaling mode needs to be converted to the single-end mode.

Through the signal processing module 114, the serial data are converted into the parallel data by adopting the working clock of the node device itself according to the preset protocol strategy.

Specifically, the electrical level modes of the high-speed real-time bus 12 may include the single-end mode, the low-voltage differential signaling mode (LVDS), a single data rate mode (SDR), and a double data rate mode (DDR). In general, the modes of the LVDS and the SDR are adopted as the electrical level modes of the high-speed real-time bus 12.

When the electrical level modes of the high-speed real-time bus 12 adopt the single-end mode, the low-voltage differential signaling mode, or the single data rate mode, the frequency of the working clock is N times that of the bus clock.

When the electrical level modes of the high-speed real-time bus 12 adopt the double data rate mode, the frequency of the working clock is 2N times that of the bus clock.

Here, N is the number of bits of the parallel data.

Through the plurality of electrical level modes of the high-speed real-time bus 12 and simple design of the bus clock and the working clocks, timing design is relatively simple, and real-time performance of the entire system is high.

Specifically, as shown in Table 1 below, a data frame format of the data signal in the data channel includes a frame ID, a data area, and a check bit.

The frame ID indicates a definition of frame data types, an occupation length is L1, and the frame ID is configured to indicate a data frame ID of a preset mode (such as entering a bus initialization mode and exiting from the bus initialization mode subsequently), and slave node device addresses or broadcast addresses corresponding to the data signal. In an actual operation, the frame ID must reserve a certain range to represent a function of broadcasting, at this time, all the slave node devices parse the data area of the frame ID, but it must be guaranteed that the reserved range contains the situations that all bits of the frame ID are 1 and all bits of the frame ID are 0. The bus will enter the bus initialization mode when all the bits are 1, and the bus exits from the bus initialization mode and enters a normal working mode when all the bits are 0. In a non-broadcast mode, the slave node device responds only to the frame ID that matches a node address of the slave node device itself. For the above broadcast function, it is to improve the response speed of the bus to fixed information, or to reduce repeated sending of common information, and reduce time that repeated information occupies the bus. Each slave node device determines whether the bus data channel is a broadcast frame through the frame ID. Here, basic constraints are imposed on the broadcast frame ID: when the frame ID is all 1, the frame ID is configured to indicate the data frame entering the bus initialization mode; the high bits of the frame ID are 1 and the lowest bits of the frame ID are 0, and the frame ID indicates the basic broadcast frame ID; the frame ID is all 0, and the frame ID is configured to indicate the data frame exiting from the bus initialization mode; and in other cases, other frame ID fields that do not affect continuity of the address number of the slave node device may be defined as the broadcast frame ID, which may be defined according to actual applications.

The data area is configured to represent the actual data content of the frame data in the data signal. An occupation length of the data area is L2, which is determined by the actual applications. At the same time, the content of the data area is defined according to the actual applications.

The check bit is a result of negation of the sum of the frame ID and each bit number of the data area. An occupation length of the check bit is L3.

In this way, an occupation length of the whole frame is L+L2+L3.

TABLE 1

| Definition | Frame ID | Data area | Check bit |
|---|---|---|---|
| Bit width | L1 | L2 | L3 |

A process of bus initialization is described below:

After the high-speed real-time bus system is started, all slave node device need to correctly receive the bus clock to be subjected to frequency multiplication to obtain the required working clock, the working clock performs a logic function of "serial to parallel" on the data channel, and the bus clock and the working clock can parse the data in the data channel correctly only in the correct phase relationship. Therefore, the master node device needs to perform the bus initialization on the entire bus, such that all the slave node devices can establish the correct phase relationship.

The process may be:

The master node device 101 generates the bus clock, sends the bus clock to the clock channel of the high-speed real-time bus 12; the data frame entering the bus initialization mode is generated, and the data frame entering the bus initialization mode is continuously sent to the data channel of the high-speed real-time bus 12; and the number of times of continuously sending the data frame entering the bus initialization mode is greater than or equal to the number of the slave node devices 102. All the bits (the frame ID, the data area and the check bit) of the data frame entering the bus initialization mode are 1, which indicates that a broadcast mode is adopted.

The slave node device 102 obtains the data frame entering the bus initialization mode from the data channel of the high-speed real-time bus 12 and enters a bus initialization mode. Since all the bits of the data frame entering the bus initialization mode are 1, the slave node device can receive the data frame with all the bits as 1 regardless of the phase relationship between the clock channel and the data channel.

The master node device 101 generates a feature code data frame, and continuously sends the feature code data frame to the data channel of the high-speed real-time bus 12; and the number of times of continuously sending the feature code data frame is greater than or equal to the number of the slave node devices 102.

The slave node device 102 obtains the feature code data frame from the data channel of the high-speed real-time bus 12; a phase of the working clock of the slave node device 102 itself is adjusted, so that content of the data frame received by the slave node device 102 and feature codes of the feature code data frame are consistent.

The master node device 101 generates the data frame exiting from the bus initialization mode, and continuously sends the data frame exiting from the bus initialization mode to the data channel of the high-speed real-time bus 12; and the number of times of continuously sending the data frame exiting from the bus initialization mode is greater than or equal to the number of the slave node devices 102.

The slave node device 102 obtains the data frame exiting from the bus initialization mode from the data channel of the high-speed real-time bus 12, and exits from the bus initialization mode to enter the normal working mode.

The master node device 101 determines whether each slave node device 102 enters the normal working mode according to the feedback information of each slave node device 102 in the topological structure; if each slave node device 102 enters the normal working mode, the high-speed real-time bus system 10 is controlled to enter the normal operation mode; and if any of the slave node devices 102 does not enter the normal working mode, the high-speed real-time bus 12 is controlled to enter the bus initialization mode again. Specifically, the master node device 101 may control the number of times of entering the bus initialization mode and related logic processing.

After the bus initialization process, the normal working mode may be started:

The master node device 101 sends the data signal to the data channel of the high-speed real-time bus 12 when the high-speed real-time bus system 10 is in the normal working mode.

The slave node device 102 obtains the data signal from the data channel of the high-speed real-time bus 12, and parse the frame ID of the data signal to determine whether the frame ID of the data signal corresponds to the preset address number of the slave node device itself, and when the frame ID of the data signal corresponds to the preset address number of the slave node device itself, data processing is performed according to the actual data content in the data area of the data signal to form a data processing result.

The master node device 101 sends another data signal with the same frame ID as the data signal to the data channel of the high-speed real-time bus 12.

The slave node device 102 obtains the another data signal from the data channel of the high-speed real-time bus 12, superposes the data processing result on a data frame of the another data signal, and sends the data processing result to the data channel of the high-speed real-time bus 12 so as to enable the master node device 101 to obtain the data processing result from the data channel of the high-speed real-time bus 12.

In addition, if a data volume of the data channel is too large to meet real-time requirements of the system, the basic data channel may be divided into two or more data channels, so that the data volume can be allocated to the plurality of data channels, and the data volume of a single data channel may be reduced. Here, this method is referred to as a bus extending mode:

For the plurality of data channels, the extended data channel has the same source and same diameter as the basic data channel, so the phase relationship between the working clock of the slave node device and the extended data channel should be correct while the bus initialization process is completed. When the working clock cannot correctly sample data of the extended data channel, additional separate working clocks need to be established for the extended data channel, and at this moment, a bus initialization function of the extended data channel may be implemented according to the above process.

For use of the extended data channel (and the plurality of data channels), a process is:

When the high-speed real-time bus system 10 is in the normal working mode, the master node device 101 sends a control data signal to the data channel of the high-speed real-time bus 12. The control data signal includes a control frame ID.

The slave node device 102 obtains the control data signal from the data channel of the high-speed real-time bus 12, superposes data to be transmitted into the control data signal corresponding to the control frame ID to form data signals to be transmitted, and allocates and transmits the data signals to be transmitted to the plurality of data channels of the high-speed real-time bus 12. The data signals to be transmitted include the control frame ID.

One or more other slave node devices 102 except the slave node device 102 obtain the data signal to be transmitted corresponding to the control frame ID from the plurality of data channels of the high-speed real-time bus 12 so as to obtain the data to be transmitted.

Thus, when the one or more other slave node devices 102 need the data to be transmitted of one data source node, a mode that the master node device obtains data of the data source node and then sends or broadcasts the data to a plurality of slave nodes is not needed, and efficiency of bus information interaction is prevented from being reduced. By adopting the control frame ID of the master node device, the data source node superposes the data to be transmitted according to the control frame ID, so that the one or more other slave node devices 102 can directly obtain the data on the bus.

The high-speed real-time bus system provided by the invention may increase a bandwidth of the high-speed real-time bus by increasing the number of the extended data channels; the bandwidth of the high-speed real-time bus may also be increased by improving the bus clock; and the volume of information of single-frame data may be increased by increasing a bit width of the high-speed real-time bus.

In the high-speed real-time bus system provided by the invention, all the node devices form the annularly connected topological structure through the high-speed real-time bus. The master node device sends the bus clock signal and the data signal to the slave node device of the next grade of the master node device in the topological structure through the clock channel and the data channel; each slave node device receives the bus clock signal and the data signal sent from the respective node device of the previous grade, performs data processing according to the bus clock signal and the data signal to update the data signal and send the bus clock signal and the updated data signal to the respective node device of the next grade, or enables the bus clock signal and the data signal to directly arrive at the respective node device of the next grade. The master node device is enabled to obtain the feedback information of each slave node device in the topological structure. In this way, the master node device may determine the state of each slave node device according to the feedback information. Each node device in the invention is only provided with the one input port and the one output port, the structure of the entire topological structure is simple, and the data signal is high in transmission speed and high in real-time performance in the topological structure. In addition, no additional hardware devices are required, the cost is relatively low, extension may be carried out by increasing the number of the data channels, and the extending mode is relatively simple. Therefore, the invention can meet data communication in the static CT system.

Figure 5:
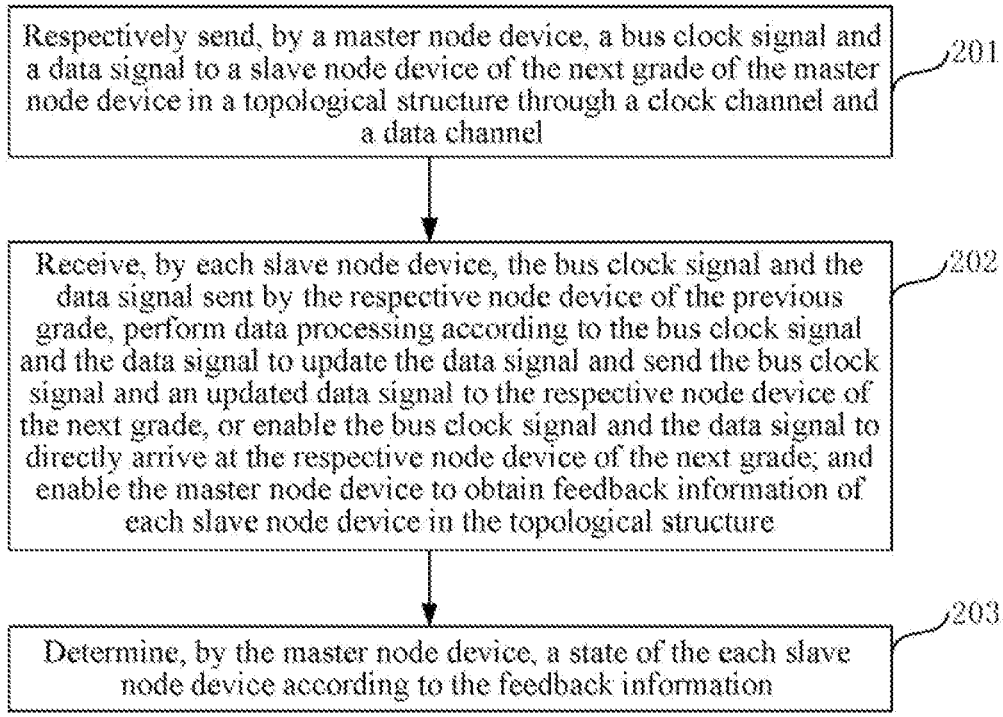
FIG. 5 is a flowchart I of a data processing method provided by the invention.

Corresponding to the high-speed real-time bus system shown in FIG. 1, as shown in FIG. 5, a data processing method for the high-speed real-time bus system provided by the embodiments of the invention includes the following steps:

Step 201, a master node device sends a bus clock signal and a data signal to a slave node device of the next grade of the master node device in a topological structure through a clock channel and a data channel.

Step 202, each slave node device receives the bus clock signal and the data signal sent by the respective node device of the previous grade, performs data processing according to the bus clock signal and the data signal to update the data signal and send the bus clock signal and an updated data signal to the respective node device of the next grade, or enables the bus clock signal and the data signal to directly arrive at the respective node device of the next grade; and the master node device is enabled to obtain feedback information of each slave node device in the topological structure.

Step 203, the master node device determines a state of each slave node device according to the feedback information.

Figure 6:
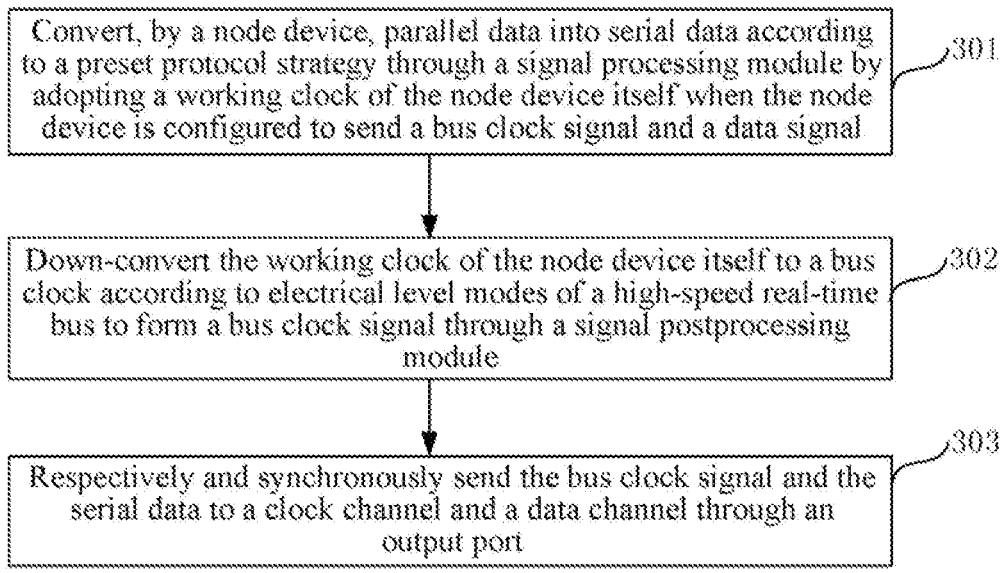
FIG. 6 is a flowchart II of the data processing method provided by the invention.

Furthermore, as shown in FIG. 6, the data processing method may further include:

Step 301, when the node device is configured to send the bus clock signal and the data signal, the node device converts parallel data into serial data through a signal processing module by adopting a working clock of the node device itself according to a preset protocol strategy.

Step 302, a signal postprocessing module down-converts the working clock of the node device itself to a bus clock according to electrical level modes of a high-speed real-time bus to form the bus clock signal.

Among them, a phase relationship between the bus clock and the working clock remains in-phase.

Step 303, the bus clock signal and the serial data are respectively and synchronously sent to the clock channel and the data channel through an output port.

Figure 7:
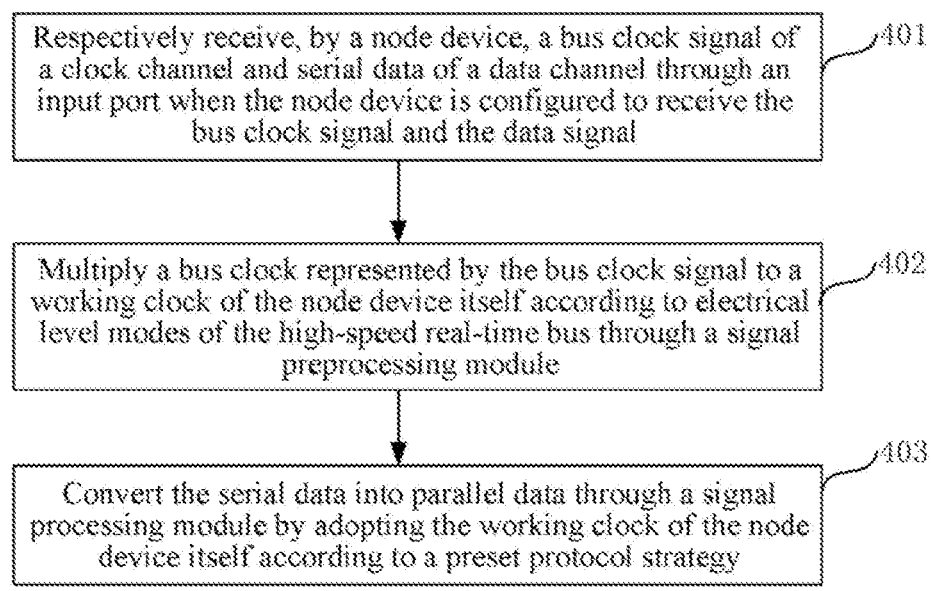
FIG. 7 is a flowchart III of the data processing method provided by the invention.

Furthermore, as shown in FIG. 7, the data processing method may further include:

Step 401, when the node device is configured to receive the bus clock signal and the data signal, the node device respectively receives the bus clock signal of the clock channel and the serial data of the data channel through an input port.

Step 402, the bus clock represented by the bus clock signal is multiplied to the working clock of the node device itself according to the electrical level modes of the high-speed real-time bus through a signal preprocessing module.

Among them, the phase relationship between the working clock and the bus clock remains in-phase.

Step 403, the serial data are converted into the parallel data by adopting the working clock of the node device itself through the signal processing module according to the preset protocol strategy.

Specifically, the electrical level modes of the high-speed real-time bus include a single-end mode, a low-voltage differential signaling mode, a single data rate mode and a double data rate mode.

When the electrical level modes of the high-speed real-time bus adopt the single-end mode, the low-voltage differential signaling mode, or the single data rate mode, a frequency of the working clock is N times that of the bus clock.

When the electrical level modes of the high-speed real-time bus adopt the double data rate mode, the frequency of the working clock is 2N times that of the bus clock.

Among them, N is the number of the bits of the parallel data.

Specifically, a data frame format of the data signal in the data channel includes a frame ID, a data area and a check bit; the frame ID is configured to represent a data frame ID of a preset mode and slave node device addresses or broadcast addresses corresponding to the data signal. The data area is configured to represent actual data content of frame data in the data signal. The check bit is a result of negation of the sum of the frame ID and each bit number of the data area.

Figure 8:
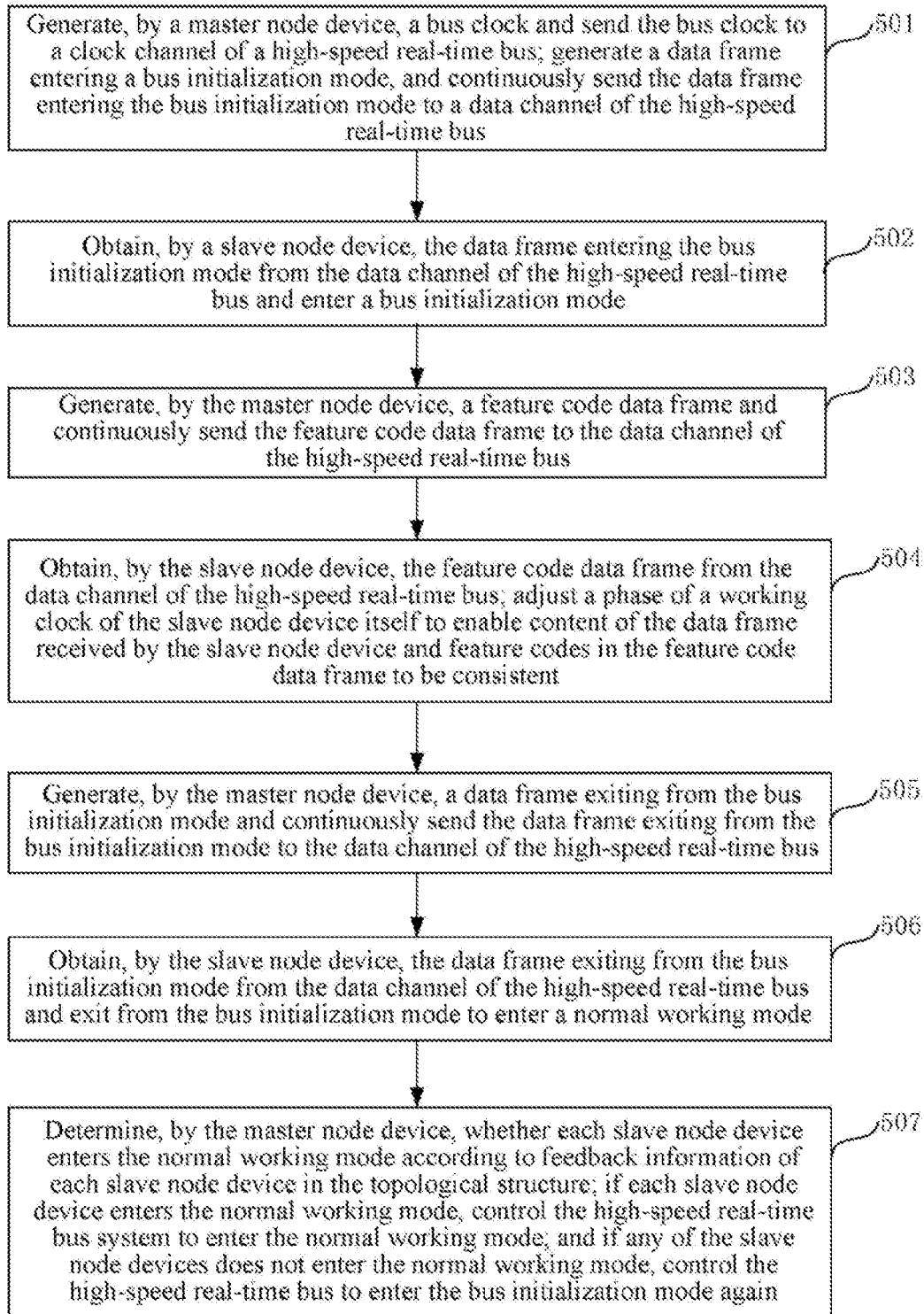
FIG. 8 is a flowchart IV of the data processing method provided by the invention.

Furthermore, as shown in FIG. 8, the data processing method may further include:

Step 501, the master node device generates a bus clock and sends the bus clock to the clock channel of the high-speed real-time bus; and a data frame entering a bus initialization mode is generated, and the data frame entering the bus initialization mode is continuously sent to the data channel of the high-speed real-time bus.

Among them, the number of times of continuously sending the data frame entering the bus initialization mode is greater than or equal to the number of the slave node devices.

Step 502, the slave node device obtains the data frame entering the bus initialization mode from the data channel of the high-speed real-time bus, and enters a bus initialization mode.

Step 503, the master node device generates a feature code data frame, and continuously sends the feature code data frame to the data channel of the high-speed real-time bus.

Among them, the number of times of continuously sending the feature code data frame is greater than or equal to the number of the slave node devices.

Step 504, the slave node device obtains the feature code data frame from the data channel of the high-speed real-time bus; and a phase of the working clock of the slave node device is adjusted, and the content of the data frame received by the slave node device and feature codes in the feature code data frame are enabled to be consistent.

Step 505, the master node device generates a data frame exiting from the bus initialization mode, and continuously sends the data frame exiting from the bus initialization mode to the data channel of the high-speed real-time bus.

Among them, the number of times of continuously sending the data frame exiting from the bus initialization mode is greater than or equal to the number of the slave node devices.

Step 506, the slave node device obtains the data frame exiting from the bus initialization mode from the data channel of the high-speed real-time bus, and exits from the bus initialization mode to enter a normal working mode.

Step 507, the master node device determines whether each slave node device enters the normal working mode according to the feedback information of each slave node device in the topological structure. If each slave node device enters the normal working mode, the high-speed real-time bus system is controlled to enter the normal working mode. If any of the slave node devices does not enter the normal working mode, the high-speed real-time bus is controlled to enter the bus initialization mode again.

Figure 9:
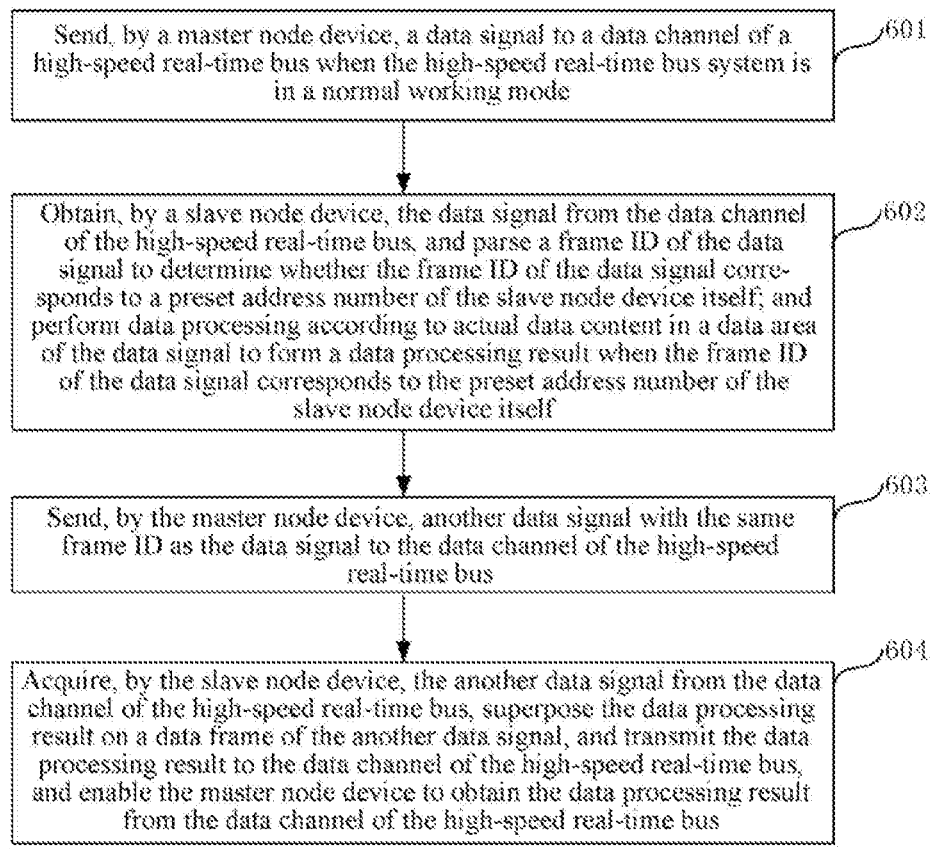
FIG. 9 is a flowchart V of the data processing method provided by the invention.

Furthermore, as shown in FIG. 9, the data processing method may further include:

Step 601, the master node device sends the data signal to the data channel of the high-speed real-time bus when the high-speed real-time bus system is in the normal working mode.

Step 602, the slave node device obtains the data signal from the data channel of the high-speed real-time bus, and parses the frame ID of the data signal to determine whether the frame ID of the data signal corresponds to a preset address number of the slave node device itself. When the frame ID of the data signal corresponds to the preset address number of the slave node device itself, data processing is carried out according to the actual data content in the data area of the data signal to form the data processing result;

Step 603, the master node device sends another data signal with the same frame ID as the data signal to the data channel of the high-speed real-time bus.

Step 604, the slave node device obtains the another data signal from the data channel of the high-speed real-time bus, superposes the data processing result on the data frame of the another data signal, and transmits the data processing result to the data channel of the high-speed real-time bus so as to enable the master node device to obtain the data processing result from the data channel of the high-speed real-time bus.

Figure 10:
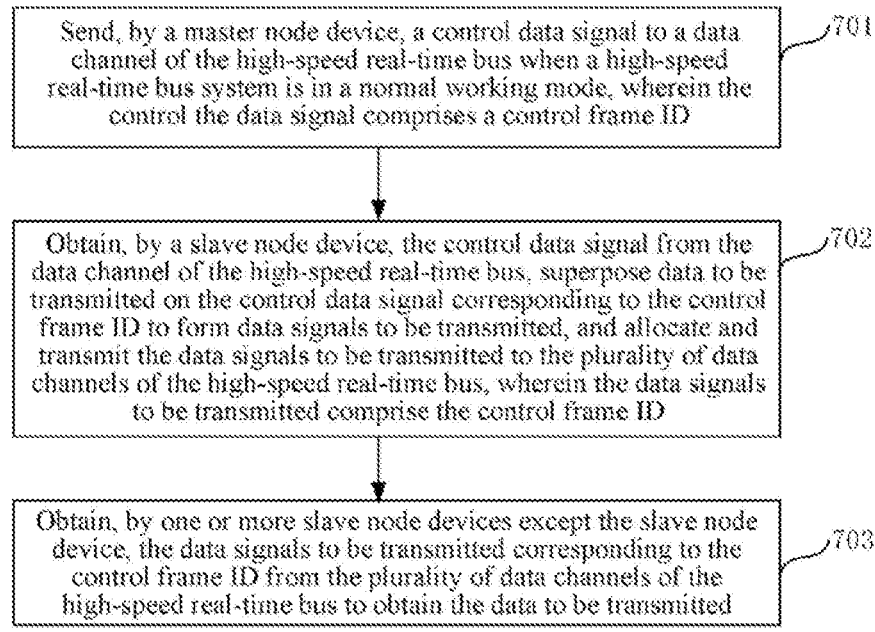
FIG. 10 is a flowchart VI of the data processing method provided by the invention.

Furthermore, as shown in FIG. 10, the data processing method may further include:

Step 701, when the high-speed real-time bus system is in the normal working mode, the master node device sends a control data signal to the data channel of the high-speed real-time bus. The control data signal includes a control frame ID.

Step 702, the slave node device obtains the control data signal from the data channel of the high-speed real-time bus, superposes the data to be transmitted into the control data signal corresponding to the control frame ID to form the data signals to be transmitted, and allocates and transmits the data signal to be transmitted to the plurality of data channels of the high-speed real-time bus. The data signals to be transmitted include the control frame ID.

Step 703, one or more slave node devices except the slave node device obtain the data signals to be transmitted corresponding to the control frame ID from the plurality of data channels of the high-speed real-time bus to obtain the data to be transmitted.

In the high-speed real-time bus system and the data processing method thereof provided by the invention, all the node devices form the annularly connected topological structure through the high-speed real-time bus. The master node device sends the bus clock signal and the data signal to the slave node device of the next grade of the master node device in the topological structure through the clock channel and the data channel. Each slave node device receives the bus clock signal and the data signal sent from the respective node device of the previous grade, performs data processing according to the bus clock signal and the data signal to update the data signal and send the bus clock signal and the updated data signal to the respective node device of the next grade, or enables the bus clock signal and the data signal to directly arrive at the respective node device of the next grade. The master node device is enabled to obtain the feedback information of each slave node device in the topological structure. In this way, the master node device may determine the state of each slave node device according to the feedback information. Each node device in the invention is only provided with the one input port and the one output port, the structure of the entire topological structure is simple, and the data signal is high in transmission speed and high in real-time performance in the topological structure. In addition, no additional hardware device is required, the cost is relatively low, the extension may be carried out by increasing the number of the data channels, and the extending mode is relatively simple. Therefore, the invention can meet the data communication requirements in the static CT system.

The high-speed real-time bus system and the data processing method thereof provided by the invention have been described in detail above. Any obvious modification made by those of ordinary skill in the art to the invention without departing from the essential of the invention shall all fall within the protection scope of the invention.

What is claimed is:

1. A high-speed real-time bus system, comprising a plurality of node devices, wherein the plurality of node devices comprise a master node device and a plurality of slave node devices; each node device comprises an input port and an output port; the output port of each of the node device is connected to the input port of another node device through a high-speed real-time bus, so that all the node devices form an annularly connected topological structure through the high-speed real-time bus; the high-speed real-time bus comprises one clock channel and at least one data channel;

the master node device is configured to respectively send a bus clock signal and a data signal to the slave node device of the next grade of the master node device in the topological structure through the clock channel and data channel;

each slave node device is configured to receive the bus clock signal and the data signal sent by the respective node device of the previous grade, perform data processing according to the bus clock signal and the data signal to update the data signal and send the bus clock signal and an updated data signal to the respective node device of the next grade, or enable the bus clock signal and the data signal to directly arrive at the respective node device of the next grade; and the master node device is enabled to obtain feedback information of each slave node device in the topological structure;

the master node device is further configured to generate a data frame entering a bus initialization mode, and continuously send the data frame entering the bus initialization mode to the data channel of the high-speed real-time bus, wherein the number of times of continuously sending the data frame entering the bus initialization mode is greater than or equal to the number of the slave node devices;

the slave node device is further configured to obtain the data frame entering the bus initialization mode from the data channel of the high-speed real-time bus, and enter a bus initialization mode;

the master node device is further configured to generate a feature code data frame and continuously send the feature code data frame to the data channel of the high-speed real-time bus, wherein the number of times of continuously sending the feature code data frame is greater than or equal to the number of the slave node devices;

the slave node device is further configured to obtain the feature code data frame from the data channel of the high-speed real-time bus; a phase of a working clock of the slave node device itself is adjusted, so that content of the data frame received by the slave node device and feature codes in the feature code data frame are consistent;

the master node device is further configured to generate a data frame exiting from the bus initialization mode and continuously send the data frame exiting from the bus initialization mode to the data channel of the high-speed real-time bus, wherein the number of times of continuously sending the data frame exiting from the bus initialization mode is greater than or equal to the number of the slave node devices;

the slave node device is further configured to obtain the data frame exiting from the bus initialization mode from the data channel of the high-speed real-time bus, and exit from the bus initialization mode to enter a normal working mode.

2. The high-speed real-time bus system according to claim 1, wherein the node device further comprises a signal preprocessing module, a signal processing module, and a signal postprocessing module; the signal processing module is respectively connected to the signal preprocessing module and the signal postprocessing module; the signal preprocessing module is connected to the high-speed real-time bus between the node device and its node device of the previous grade through the input port; and the signal postprocessing module is connected to the high-speed real-time bus between the node device and its node device of the next grade through the output port.

3. The high-speed real-time bus system according to claim 2, wherein when the node device is configured to send the bus clock signal and the data signal, the node device is specifically configured to:

convert parallel data into serial data through the signal processing module by adopting a working clock of the node device itself according to a preset protocol strategy;

down-convert the working clock of the node device itself to a bus clock through the signal postprocessing module according to electrical level modes of the high-speed real-time bus to form the bus clock signal, wherein a phase relationship between the bus clock and the working clock remains in-phase; and respectively and synchronously send the bus clock signal and the serial data to the clock channel and the data channel through the output port.

4. The high-speed real-time bus system according to claim 2, wherein when the node device is configured to receive the bus clock signal and the data signal, the node device is specifically configured to:

respectively receive the bus clock signal of the clock channel and serial data of the data channel through the input port;

multiply a bus clock represented by the bus clock signal to a working clock of the node device itself according to electrical level modes of the high-speed real-time bus through the signal preprocessing module, wherein a phase relationship between the working clock and the bus clock remains in-phase; and convert the serial data into parallel data through the signal processing module by adopting the working clock of the node device itself according to a preset protocol strategy.

5. The high-speed real-time bus system according to claim 1, wherein the master node device is further configured to determine whether each slave node device enters the normal working mode according to the feedback information of each slave node device in the topological structure; if each slave node device enters the normal working mode, the high-speed real-time bus system is controlled to enter the normal working mode; and if any of the slave node devices does not enter the normal working mode, the high-speed real-time bus is controlled to enter the bus initialization mode again.

6. The high-speed real-time bus system according to claim 5, wherein the master node device is further configured to send the data signal to the data channel of the high-speed real-time bus when the high-speed real-time bus system is in the normal working mode;

the slave node device is further configured to obtain the data signal from the data channel of the high-speed real-time bus, and parse a frame ID of the data signal to determine whether the frame ID of the data signal corresponds to a preset address number of the slave node device itself; when the frame ID of the data signal corresponds to the preset address number of the slave node device itself, data processing is carried out according to actual data content in a data area of the data signal to form a data processing result;

the master node device is further configured to send another data signal with the same frame ID as the data signal to the data channel of the high-speed real-time bus; and the slave node device is further configured to obtain the another data signal from the data channel of the high-speed real-time bus, superpose the data processing result on a data frame of the another data signal, and transmit the data processing result to the data channel of the high-speed real-time bus, so that the master node device obtains the data processing result from the data channel of the high-speed real-time bus.

7. The high-speed real-time bus system according to claim 5, wherein the master node device is further configured to send a control data signal to the data channel of the high-speed real-time bus when the high-speed real-time bus system is in the normal working mode; the control data signal comprises a control frame ID;

the slave node device is further configured to obtain the control data signal from the data channel of the high-speed real-time bus, superpose data to be transmitted into the control data signal corresponding to the control frame ID to form data signals to be transmitted, and allocate and transmit the data signals to be transmitted to the plurality of data channels of the high-speed real-time bus; the data signals to be transmitted comprise the control frame ID; and one or more slave node devices except the slave node device are configured to obtain the data signals to be transmitted corresponding to the control frame ID from the plurality of data channels of the high-speed real-time bus to obtain the data to be transmitted.

8. The high-speed real-time bus system according to claim 1, wherein the master node device determines a state of each slave node device according to the feedback information.

9. A data processing method for a high-speed real-time bus system, wherein the high-speed real-time bus system comprises a plurality of node devices; the plurality of node devices comprise a master node device and a plurality of slave node devices; each node device comprises an input port and an output port; the output port of each of the node device is connected to the input port of another node device through a high-speed real-time bus, so that all the node devices form an annularly connected topological structure through the high-speed real-time bus; the high-speed real-time bus comprises one clock channel and at least one data channel; and the data processing method comprises the following steps:

respectively sending, by the master node device, a bus clock signal and a data signal to the slave node device of the next grade of the master node device in the topological structure through the clock channel and the data channel;

receiving, by each slave node device, the bus clock signal and the data signal sent by the respective node device of the previous grade, performing data processing according to the bus clock signal and the data signal to update the data signal and send the bus clock signal and an updated data signal to the respective node device of the next grade, or enabling the bus clock signal and the data signal to directly arrive at the respective node device of the next grade; enabling the master node device to obtain feedback information of each slave node device in the topological structure; and determining, by the master node device, a state of each slave node device according to the feedback information, wherein generating, by the master node device, a data frame entering a bus initialization mode, and continuously sending the data frame entering the bus initialization mode to the data channel of the high-speed real-time bus, wherein the number of times of continuously sending the data frame entering the bus initialization mode is greater than or equal to the number of the slave node devices;

obtaining, by the slave node device, the data frame entering the bus initialization mode from the data channel of the high-speed real-time bus and entering a bus initialization mode;

generating, by the master node device, a feature code data frame and continuously sending the feature code data frame to the data channel of the high-speed real-time bus, wherein the number of times of continuously sending the feature code data frame is greater than or equal to the number of the slave node devices;

obtaining, by the slave node device, the feature code data frame from the data channel of the high-speed real-time bus; adjusting a phase of a working clock of the slave node device itself to enable content of the data frame received by the slave node device and feature codes in the feature code data frame to be consistent;

generating, by the master node device, a data frame exiting from the bus initialization mode, and continuously sending the data frame exiting from the bus initialization mode to the data channel of the high-speed real-time bus, wherein the number of times of continuously sending the data frame exiting from the bus initialization mode is greater than or equal to the number of the slave node devices;

obtaining, by the slave node device, the data frame exiting from the bus initialization mode from the data channel of the high-speed real-time bus and exiting from the bus initialization mode to enter a normal working mode.

10. The data processing method according to claim 9, wherein the node device further comprises a signal preprocessing module, a signal processing module, and a signal postprocessing module; the signal processing module is respectively connected with the signal preprocessing module and the signal postprocessing module; the signal preprocessing module is connected to the high-speed real-time bus between the node device and its node device of the previous grade through the input port; and the signal postprocessing module is connected to the high-speed real-time bus between the node device and its node device of the next grade through the output port.

11. The data processing method according to claim 10, further comprising:
  converting, by the node device, parallel data into serial data through the signal processing module by adopting a working clock of the node device itself according to a preset protocol strategy when the node device is configured to send the bus clock signal and the data signal;
  down-converting the working clock of the node device itself to a bus clock according to electrical level modes of the high-speed real-time bus to form the bus clock signal through the signal postprocessing module, wherein a phase relationship between the bus clock and the working clock remains in-phase; and
  respectively and synchronously sending the bus clock signal and the serial data to the clock channel and the data channel through the output port.

12. The data processing method according to claim 10, further comprising:
  respectively receiving, by the node device, the bus clock signal of the clock channel and the serial data of the data channel through the input port when the node device is configured to receive the bus clock signal and the data signal;
  multiplying a bus clock represented by the bus clock signal to a working clock of the node device itself according to electrical level modes of the high-speed real-time bus through the signal preprocessing module, wherein a phase relationship between the working clock and the bus clock remains in-phase; and
  converting the serial data into parallel data through the signal processing module by adopting the working clock of the node device itself according to a preset protocol strategy.

13. The data processing method according to claim 9, further comprising:
  determining, by the master node device, whether each slave node device enters the normal working mode according to the feedback information of each slave node device in the topological structure; if each slave node device enters the normal working mode, the high-speed real-time bus system is controlled to enter the normal working mode; and if any of the slave node devices does not enter the normal working mode, the high-speed real-time bus is controlled to enter the bus initialization mode again.

14. The data processing method according to claim 13, further comprising:
  sending, by the master node device, the data signal to the data channel of the high-speed real-time bus when the high-speed real-time bus system is in the normal working mode;
  obtaining, by the slave node device, the data signal from the data channel of the high-speed real-time bus, and parsing a frame ID of the data signal to determine whether the frame ID of the data signal corresponds to a preset address number of the slave node device itself;
  performing data processing according to actual data content in a data area of the data signal to form a data processing result when the frame ID of the data signal corresponds to the preset address number of the slave node device itself;
  sending, by the master node device, another data signal with the same frame ID as the data signal to the data channel of the high-speed real-time bus; and
  obtaining, by the slave node device, the another data signal from the data channel of the high-speed real-time bus, superposing the data processing result on a data frame of the another data signal, and transmitting the data processing result to the data channel of the high-speed real-time bus, and enabling the master node device to obtain the data processing result from the data channel of the high-speed real-time bus.

15. The data processing method according to claim 13, further comprising:
  sending, by the master node device, a control data signal to the data channel of the high-speed real-time bus when the high-speed real-time bus system is in the normal working mode, wherein the control data signal comprises a control frame ID;
  obtaining, by the slave node device, the control data signal from the data channel of the high-speed real-time bus, superposing data to be transmitted into the control data signal corresponding to the control frame ID to form data signals to be transmitted, and allocating and transmitting the data signals to be transmitted to the plurality of data channels of the high-speed real-time bus, wherein the data signals to be transmitted comprise the control frame ID; and
  obtaining, by one or more slave node devices except the slave node device, the data signals to be transmitted corresponding to the control frame ID from the plurality of data channels of the high-speed real-time bus to obtain the data to be transmitted.

16. The high-speed real-time bus system according to claim 1, wherein electrical level modes of the high-speed real-time bus comprise a single-end mode, a low-voltage differential signaling mode, a single data rate mode and a double data rate mode;
  when the single-end mode, the low-voltage differential signaling mode or the single data rate mode is adopted as the electrical level mode of the high-speed real-time bus, a frequency of a working clock is N times that of a bus clock; and
  when the double data rate mode is adopted as the electrical level mode of the high-speed real-time bus, the frequency of the working clock is 2N times that of the bus clock;
  wherein N is the number of bits of parallel data.

17. The high-speed real-time bus system according to claim 1, wherein a data frame format of the data signal comprises a frame ID, a data area and a check bit; the frame ID is configured to represent the data frame ID of a preset mode and a slave node device address or a broadcast address corresponding to the data signal; the data area is configured to represent actual data content of frame data in the data signal; and the check bit is a result of negation of the sum of the frame ID and each bit number of the data area.

18. The data processing method according to claim 9, wherein electrical level modes of the high-speed real-time bus comprise a single-end mode, a low-voltage differential signaling mode, a single data rate mode and a double data rate mode;
  when the single-end mode, the low-voltage differential signaling mode or the single data rate mode is adopted as the electrical level mode of the high-speed real-time bus, a frequency of a working clock is N times that of a bus clock; and
  when the double data rate mode is adopted as the electrical level mode of the high-speed real-time bus, the frequency of the working clock is 2N times that of the bus clock;
  wherein N is the number of bits of parallel data.

19. The data processing method according to claim 9, wherein a data frame format of the data signal comprises a frame ID, a data area and a check bit; the frame ID is configured to represent the data frame ID of a preset mode and a slave node device address or a broadcast address corresponding to the data signal; the data area is configured to represent actual data content of frame data in the data signal; and the check bit is a result of negation of the sum of the frame ID and each bit number of the data area.

* * * * *